US011718041B2

(12) United States Patent
Zhou et al.

(10) Patent No.: US 11,718,041 B2
(45) Date of Patent: Aug. 8, 2023

(54) COOPERATIVE 3D PRINTING PLATFORM

(71) Applicant: BOARD OF TRUSTEES OF THE UNIVERSITY OF ARKANSAS, Little Rock, AR (US)

(72) Inventors: Wenchao Zhou, Springdale, AR (US); Lucas Galvan Marques, Fayetteville, AR (US); Robert Austin Williams, Fayetteville, AR (US)

(73) Assignee: Board Of Trustees Of The University Of Arkansas, Fayetteville, AR (US)

( * ) Notice: Subject to any disclaimer, the term of this patent is extended or adjusted under 35 U.S.C. 154(b) by 15 days.

(21) Appl. No.: 17/497,856

(22) Filed: Oct. 8, 2021

(65) Prior Publication Data

US 2022/0063203 A1 Mar. 3, 2022

Related U.S. Application Data

(63) Continuation-in-part of application No. 15/973,499, filed on May 7, 2018, now abandoned.
(Continued)

(51) Int. Cl.
| *B29C 64/227* | (2017.01) |
| *B29C 64/393* | (2017.01) |
| *B33Y 30/00* | (2015.01) |
| *B29C 64/209* | (2017.01) |
| *B29C 64/236* | (2017.01) |
| *B33Y 50/02* | (2015.01) |
| *B29C 64/30* | (2017.01) |

(Continued)

(52) U.S. Cl.
CPC .......... *B29C 64/393* (2017.08); *B29C 64/209* (2017.08); *B29C 64/236* (2017.08); *B29C 64/30* (2017.08); *B33Y 30/00* (2014.12); *B33Y 50/02* (2014.12); *B29C 64/379* (2017.08); *H01R 41/00* (2013.01); *H01R 2201/26* (2013.01)

(58) Field of Classification Search
CPC ............... B29C 64/227; B29C 64/232; B29C 64/236; B29C 64/241; B29C 64/245
See application file for complete search history.

(56) References Cited

U.S. PATENT DOCUMENTS

| 2,176,891 A | 10/1939 | Crom |
| 3,914,077 A | 10/1975 | Lodes |

(Continued)

FOREIGN PATENT DOCUMENTS

| RU | 2636980 C1 | 11/2017 |
| WO | 0141976 A1 | 6/2001 |

OTHER PUBLICATIONS

Currence et al., "A Floor Power Module for Cooperative 3D Printing", Solid Freeform Fabrication 2017: Proceedings of the 28th Annual International Solid Freeform Fabrication Symposium—An Additive Manufacturing Conference, pp. 1661-1683. (Year: 2017).*
(Continued)

*Primary Examiner* — Atul P. Khare
(74) *Attorney, Agent, or Firm* — Keith A. Vogt; Keith Vogt Ltd.

(57) ABSTRACT

A 3-D printing system comprising a plurality of printers. The printers are motorized to allow movement in X and Y directions or to rotate freely. Each printer may have one or more printheads. Also provided is a surface independent from said printers adapted to receive a printed object.

20 Claims, 8 Drawing Sheets

Related U.S. Application Data

(60) Provisional application No. 62/502,401, filed on May 5, 2017.

(51) Int. Cl.
  *H01R 41/00* (2006.01)
  *B29C 64/379* (2017.01)

(56) References Cited

U.S. PATENT DOCUMENTS

| | | | |
|---|---|---|---|
| 8,518,308 | B2 | 8/2013 | Khoshnevis |
| 8,922,817 | B2 | 12/2014 | Matsumoto |
| 9,849,693 | B1 | 12/2017 | Liu |
| 10,189,187 | B2 | 1/2019 | Keating |
| 10,478,972 | B2 | 11/2019 | Lipinski |
| 10,486,330 | B2 | 11/2019 | Giles |
| 2014/0374933 | A1 | 12/2014 | Flitsch |
| 2015/0165690 | A1 | 6/2015 | Tow |
| 2018/0126641 | A1 | 5/2018 | Tyler |

OTHER PUBLICATIONS

McPherson, J. J. (2018). "A Scalable, Chunk-based Slicer for Cooperative 3D Printing". University of Arkansas, Fayetteville, Computer Science and Computer Engineering Undergraduate Honors Theses. (Year: 2018).*

Poudel et al., "Architecting the Cooperative 3D Printing System", Proceedings of the ASME 2020 International Design Engineering Technical Conferences and Computers and Information in Engineering Conference IDETC/CIE2020, V009T09A029-1-13. (Year: 2020).*

Howe et al; Athlete as a mobile ISRU and regolith construction platform; ASCE Earth and Space 2016 Conference; Orlando, FL; Apr. 11-15, 2016.

Howe et al; Faxing Structures to the Moon: Freeform Additive Construction System (FACS); AIAA Space 2013 Conference and Exposition, Sep. 10-12, 2013.

Siemens; These Spider-Inspired, 3D-Printing Robots Are Coming to a Job Site New Year; 5 pages; ArchitectMagazine.com; at least as early as May 17, 2016.

Donaldson, Brent; Robots, Assemble! A New Path to Autonomous Mobile 3D Printing; Additive Manufacturing; at least as early as Jun. 4, 2021; Cincinnati, OH; US.

Worley, Sam; The 5 Coolest Things On Earth This Week; GE; least as early as Jun. 4, 2021; Boston, MA; US.

O'Neal; University of Arkansas: Research Group Delegates 3D Printing Duties to Their Swarm of Robots; 3D print.com; least as early as Jun. 4, 2021; 3DR Holdings (Pty), Ltd.; South Africa.

McGowan; Cover Story by Research Frontiers of University of Arkansas for Spring 2019, The New Factory: Building a 'Swarm' of Mobile, Autonomous Robots; Feb. 28, 2019; US.

Carlota V; Ambots is our 3D startup of 2019!; 3Dnatives; Jan. 3, 2020; Paris, FR.

Arkansas Money and Politics, "Arkansas Startup Named One of Five Coolest Things on Earth", https://armoneyandpolitics.com/arkansas-startup-coolest-things/; Jun. 21, 2019; US.

Iftikhar; "Thesis Focuses on Using Cooperative 3D Printing with Robots to Improve the Technology's Scalability", https://3dprint.com/232301/cooperative-3d-printing-with-robots-to-improve-scalability/; 3DPrint com; Mar. 19, 2019.

Jackson; "The Chunk-Based Slicing Algorithm Is Critical to The Success Of Cooperative 3d Printing, Which May Enable An Autonomous Factory Equipped With A Swarm Of Autonomous Mobile 3d Printers And Mobile Robots For Autonomous Manufacturing And Assembly", https://3dprintingindustry.com/news/the-chunker-chunk-based-slicer-proposed-for-cobot-3d-printing-141602/; 3dprintingindustry.com; Oct. 16, 2018.

Carlota V; "#3DStartup: Ambots, revolutionising swarm 3D printing", https://www.3dnatives.com/en/3dstartup-ambots-040720194/; 3Dnatives; Jul. 4, 2019; Paris, FR.

3D Printing The Definitive Guide; Ambots, collaborative cellular 3D printers, usher in a new era of digital manufacturing unit; the 3D Printing World; at least as early as Jun. 2021; US.

* cited by examiner

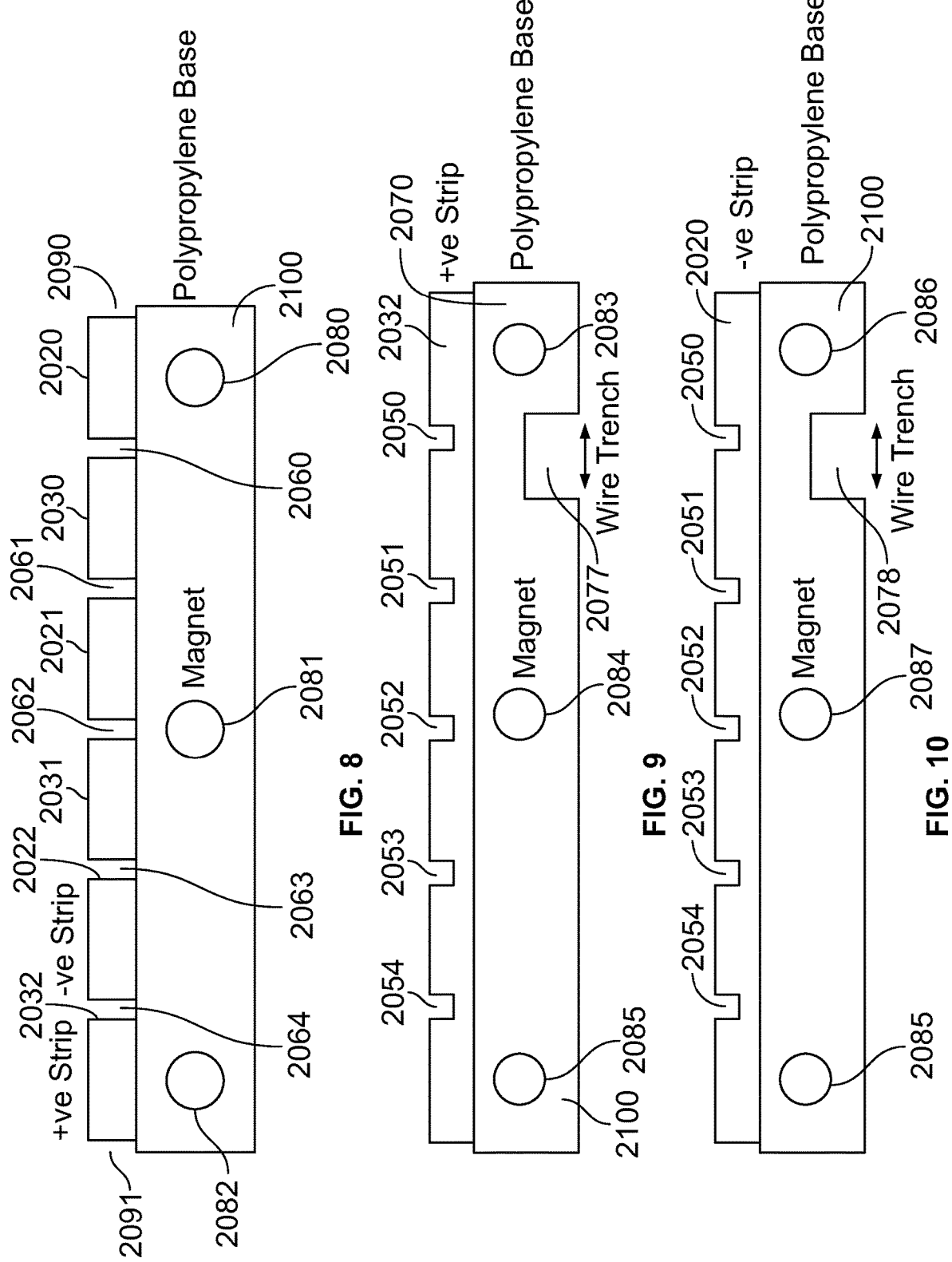

COOPERATIVE 3D PRINTING PLATFORM

RELATED APPLICATIONS

This application is a continuation-in-part of U.S. Ser. No. 15/973,499 filed May 7, 2018, which claims the benefit of U.S. Provisional Application No. 62/502,401 filed May 5, 2017, both of which are herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Although 3D printing has become increasingly popular, it remains a niche technology due to its inability to scale, in terms of printing large objects and printing fast.

BRIEF SUMMARY OF THE INVENTION

In one embodiment, the present invention provides a novel platform for 3D printing and assembly, which can enable a low-cost autonomous factory with greatly enhanced flexibility.

In other embodiments, the present invention may significantly increase the speed of 3D printing by having a plurality of mobile 3D printers working together on one printing job.

In other embodiments, the present invention is not limited to printing objects that only fit on or within a print bed since the embodiments include mobile printers that eliminate the need for a dedicated print bed and accordingly may travel over the entire factory floor or another surface.

In other embodiments, the present invention significantly increases the capability of 3D printing by using hybrid 3D printing which can use a pick-and-place mechanism such as a robotic hand to pick and place components that cannot be 3D printed and assemble them into other structures during the printing process.

In other embodiments, the present invention enables 3D printing with different 3D printing processes with different printing materials, which can potentially overcome the disadvantages of any single 3D printing process.

In other embodiments, the present invention enables cloud manufacturing by providing a network connection such as an Internet connection to all the mobile robots.

In other embodiments, the present invention can potentially replace assembly lines in factories and thus significantly reduce the cost and increase the flexibility of factories.

In other embodiments, the present invention provides a chunk-by-chunk based slicing and printing method that allows each printer to print a small chunk at a time, which can effectively separate the printers. The key difference of the chunk-based cooperative 3D printing from other types of robotic 3D printing, contour crafting, or multi-head/multi-axis 3D printing is that the cooperation is amongst multiple independent additive manufacturing systems. In a preferred embodiment, a plurality or swarm of mobile 3D printers and other specialized robots (e.g., a pick-and-place robot) work together in an autonomous digital factory. Chunk-based printing may also keep 3D printing localized and therefore potentially avoid the large temperature gradient and internal stress that are common with 3D printing large objects. With proper scheduling of each individual mobile printer, invention may be scaled to a very large number of mobile printers without interference.

In another embodiment, the present invention addresses a prevalent issue with mobile robotics which is that they do not have a simple solution for positioning themselves with absolute certainty. For example, if a robot is fully disconnected from a greater positioning system, it has no way of determining its 'absolute' position, since all movements will be made relative to its current position (wherever that may be).

In another embodiment, the present invention provides a floor power module that functions as a platform from which the robot may determine its absolute position on top of the floor surface. The mobile printer will make movements relative to the floor, which is a known, stationary reference.

In another embodiment, the present invention provides a floor power module that uses transitioning strips (e.g., when a brush transitions from a positive to a negative strip) to derive both the position and orientation of the robot on the floor. This embodiment makes it possible to know the position of each brush mounted on the robot, and that the strips are each a specified width across and apart from each other.

In another embodiment, the present invention provides a floor power module that enables a mobile 3D printer to derive its position on the floor surface from a plurality of brush transitioning strips, in addition to providing continuous, uninterrupted power during operation. This embodiment allows the brushes to transition in any direction of motion on the floor, and the brush geometry and apparatus is designed to match the new positioning floor surface.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 8 is a base front view showing strips with grooves and magnets for an embodiment of the present invention.

FIG. 9 is a base left side view showing strips with grooves and magnets for an embodiment of the present invention.

FIG. 10 is a base right side view showing strips with grooves and magnets for an embodiment of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In a preferred embodiment, the present invention provides systems and methods that use remote connection such as that provided by a network or Internet to connected autonomous robots for 3D printing and assembly of any object. In certain aspects, the embodiments of the present invention entail an autonomous factory equipped with a plurality of mobile robots that perform 3D printing and assembly, which can potentially maximize the flexibility of a factory eliminating the need for costly assembly lines. Each robot may either carry a 3D printing printhead to deposit materials one chunk or portion at a time (versus one layer at a time like existing 3D printing technology) and/or a pick-and-place mechanism such as a robotic hand (i.e., a gripper) to pick and place components.

Each printer may be equipped with a plurality of interchangeable printheads. The use of multiple printheads that are interchangeable means that the printers or robots can be used for different purposes such as depositing different materials, such as hard materials, soft materials, conductive materials, etc. The robots may also vary in size, be adapted to use printheads with different printing resolutions such that an optimal tradeoff between printing speed and printing accuracy can be achieved. The robotic hand or pick-and-place mechanism will pick and place components that cannot be 3D printed and embed them in the 3D printed structures during the 3D printing process. This technology allows for the scaling of 3D printing in terms of both printing large objects or printing fast. The capability of combining different printing process as well as assembly with traditionally manufactured parts provides unprecedented manufacturing capabilities for fabricating/assembling sophisticated devices (e.g., an iPhone) autonomously. All the robots may be connected and coordinated together remotely by the Internet or other desired network connection. In a preferred embodiment, the printers are coordinated by a central server for easy management. The manufacturing capability of the mobile printer-equipped factory can be offered as a service over the Internet, where anyone can send their design to the central server automatic fabrication.

Figure 1:
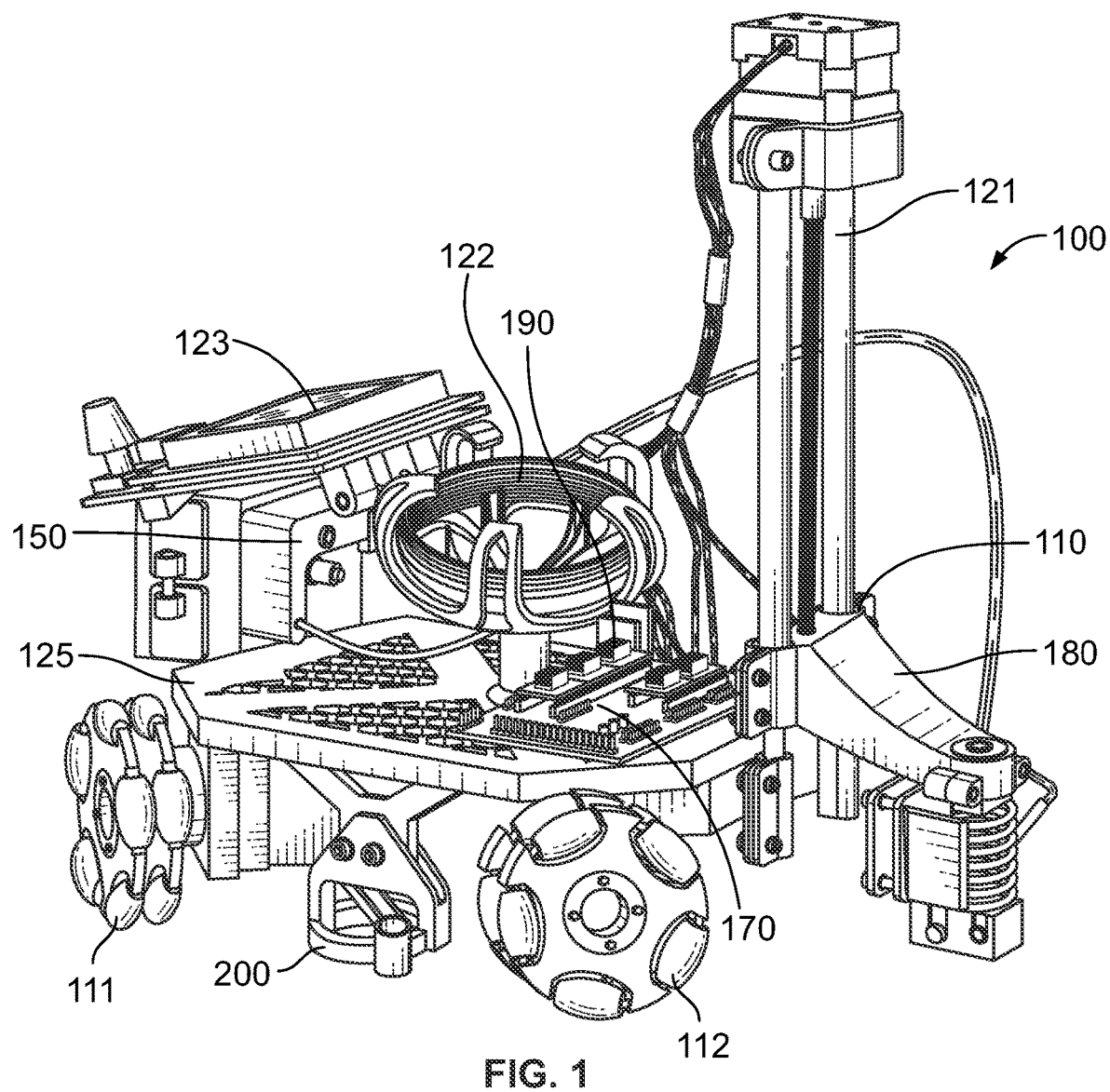
FIG. 1 illustrates an embodiment of the present invention.

In one preferred embodiment, as shown in FIG. 1, the present invention may include a mobile printer 100 comprised of three components: a mechanical system 110, an electrical system for controlling the mechanical motions, and software.

Mechanical System.

The mechanical system consists of a motion system using stepper motor-driven omnidirectional wheels 111 and 112 for the mobile printer 100 to navigate on a floor in X and Y directions or rotate freely. Also included are a positionable printhead 180 for printing materials and one or more 190 and 200 to provide information as to the position and orientation of the mobile printer. Printer 100 may also include Z-stage 121 for the printhead, filament spool 122, control panel 123, unibody 125, and extruder 150.

Electrical System

The electrical system consists of the circuit boards 170 and the electronics that are needed to drive the stepper motors as well as power supply.

Software

The software translates the design into motor signals to control the motion of the printing process.

In yet other embodiments, one or more of the sensors, such as sensor 200, may be located underneath printer 100 and/or between the wheels. The one or more position sensors are configured to take a series of pictures and compare the pictures to obtain the relative motion of the printer. Multiple sensors may be used for better accuracy.

The stepper motor of the wheels may also be configured to count how many degrees the wheels have rotated respectively. A sensor fusion algorithm may then be used to fuse all positional information together to provide accurate positioning of printer 100 on the ground.

A PID feedback control may be implemented to make sure the robot moves based on the instructions from a print file. The robot may be connected to a central server over the Internet using WIFI.

Figure 2:
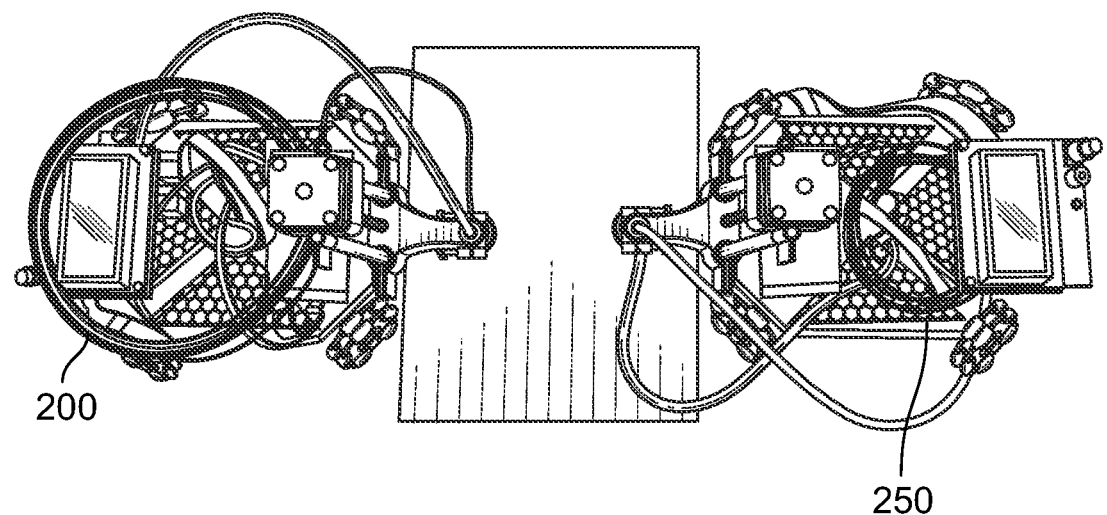
FIG. 2 illustrates another embodiment of the present invention using cooperative 3D printing.

A two-way communication system may be provided for the user to send commands to the robot in real-time and receive sensor information and live video from the printer. A plurality of printers 200 and 250 may be coordinated such as by a central server to perform printing tasks cooperatively as shown in FIG. 2. For this embodiment, printers 200 and 250 work cooperatively on a task.

Figure 3:
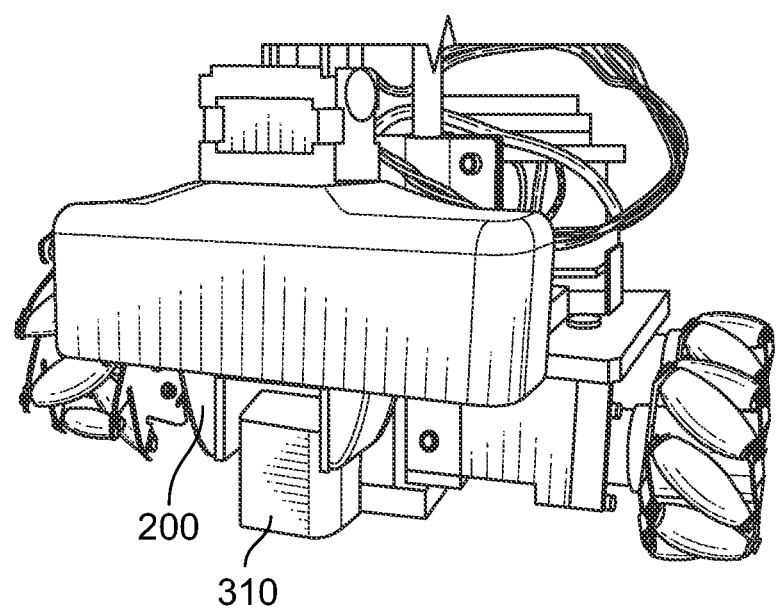
FIG. 3 illustrates another embodiment of the present invention using a pick and place feature.

As shown in FIG. 3, a pick-and-place module 300 may also be provided to pick and place pre-manufactured components 310 into the 3D printed structures during the printing process. Module 300 is adapted to grip or retain an object for placement.

In yet other embodiments, the present invention provides a printhead 180 or multiple interchangeable printheads that may have the following capabilities: a gear-pump based extrusion head for printing liquid resin, adhesives, or hot-melt materials, such as gels, which cannot normally be printed by a FDM printhead; a gear-pump based extrusion head for printing photopolymers, which are usually printed by stereolithography; a gripper for picking and placing traditionally-manufactured components (e.g., ICs, circuit boards, etc.); and a printhead for dispensing copper tape for printing electrical circuits.

Figure 4:
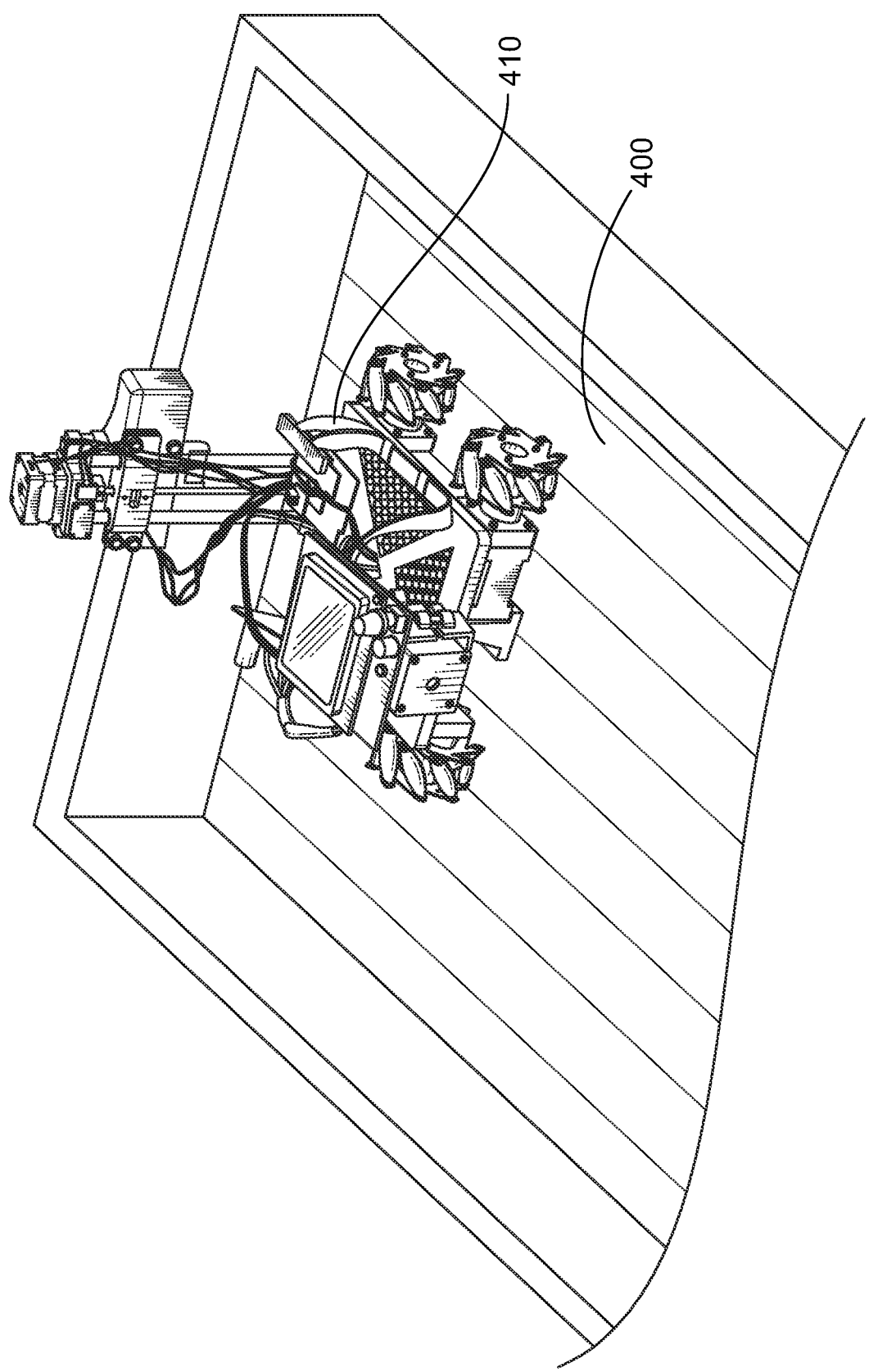
FIG. 4 illustrates another embodiment of the present invention using a powered floor.

In yet other embodiments, as shown in FIG. 4, the present invention includes a floor power module 400 such that the printer 410 can draw power from the factory floor. This eliminates the need for batteries. In other embodiments, other sources of power may be used to power the printers such as gasoline.

In another embodiment, the power floor will not be the printing surface. Instead, a printing surface may be provided such as a block with some additional functionalities, such as heated bed, before the printing starts. The power floor will power both the mobile robots and the printing surface (if the printing surface needs to be heated).

The present invention may also include a dedicated slicing algorithm for the cooperative 3D printing platform. Instead of slicing an object into layers like traditional 3D printing slicers, the present invention is adapted to slice the object-to-be-printed into chunks such that each printer or robot can print one chunk at a time without interfering with each other. This also makes sure the chucks bond well with each other. The slicer will also allow combining traditional manufacturing with 3D printing by dividing the object-to-be-printed into parts that may be printed and parts that may be pre-manufactured. As to the pre-manufactured, they may be assembled using module 300 as described above.

In other aspects, the present invention includes printers connected to a network such as a central server through Wi-Fi. The printer may include a camera that sends real-time information to the central server while receiving commands from the central server. The planning will be done on the central server and commands will be generated and sent to individual printers.

In still other aspects, the present invention provides for the creation of a manufacturing facility equipped with a plurality of independent printers or robots of different sizes carrying different types of printheads, to provide flexibility for manufacturing and assembly. The manufacturing capability may be accessible through the Internet or other networks. APIs may be used to allow third-parties to use this manufacturing capability to manufacture their own products without needing to establish their own factory. In other preferred embodiments, the present invention provides a digital assembly line that can be adapted for different tasks, which makes mass customization possible (in comparison to mass production enabled by the traditional assembly line).

In still other aspects, the present invention provides printheads configured to take advantage of existing manufacturing technologies to achieve a comparable product quality without using traditional manufacturing techniques. For example, a tape-laying printhead may be used to lay down carbon fibers, which has been used in the production of Boeing 787, to integrate carbon fiber tapes during the 3D printing process to significantly improve the mechanical properties of an object. The same tape-laying printhead may also be used to lay down copper tapes, which will significantly improve the electrical properties to the level of traditional manufacturing. Also, a fiber-laying printhead may be used to lay down metal wires, glass fibers, carbon fibers, etc., to improve mechanical properties of the product.

Other printheads may be adapted to extrude resins, glues, and other materials using a liquid extruder and use them wherever needed in the printing process for different purposes (e.g., improve bonding, surface finish, flexibility, etc.). d). A gripper may be used to pick and place pre-manufactured components (e.g., a CPU) that cannot be easily "laid down" additively in places where they need to be placed. e). Printheads for different materials (e.g., soft materials, electrical materials, optical materials, construction materials, etc.) or operations (e.g., pressing, blowing hot air, etc.), can be simply integrated into the platform.

In other embodiments, the present invention provides a system and method that use Internet-connected autonomous robots for 3D printing and assembly that may use a novel platform for 3D printing and assembly, which can enable a low-cost autonomous factory with greatly enhanced flexibility. In other aspects, the invention involves a system and method that provide a plurality of mobile 3D printers working together on one or more printing jobs. The system and method are not limited to printing objects that only fit on or within a print bed by using mobile printers that eliminate the need for a dedicated print bed and accordingly may travel over the entire factory floor or another surface.

In other aspects, the present invention provides that enable cloud manufacturing by providing Internet connection to all the printers/mobile robots and permits the planning and coordination of printing jobs. In other aspects, the system and method that provide a printer having position sensors underneath the robot, the position sensors take a series pictures and compare the pictures to obtain the relative motion of the robots. One or more live video cameras may also be used to sense the environment and provide additional positioning information and printing information to improve printing quality. Thus, the printers of the system and method have the capability to sense and re-construct its environment using multiple sensors (e.g., collision sensors) and live video cameras for feedback control of the printing and assembly process (e.g., repairing the part in real time where the print is not matching with the design).

In yet another embodiment, the present invention provides a 3-D printing system having a plurality of printers which are motorized to allow movement in X and Y directions or to rotate freely. Each printer may have one or more printheads and printing surface independent from the printers adapted to receive a printed object. The system may also include one or more position sensors that take a series pictures and compare the pictures to obtain the relative motion of the printers. In addition, the system may include one or more sensors adapted to sense and re-construct the printing environment using feedback control of the printing and assembly process to check progress make changes and to perform other desired functions.

In other embodiments, the present invention provides a 3-D printing method comprising the steps of providing a plurality of printers that are motorized to allow movement in X and Y directions or to rotate freely. Each printer has one or more printheads. Also provided is a printing surface independent from said printers adapted to receive a printed object and that may be further adapted to provide power to the printers.

The method may also include one or more position sensors that take a series pictures and compare the pictures to obtain the relative motion of the printers. In addition, method may include one or more sensors adapted to sense and re-construct the printing environment using feedback control of the printing and assembly process to check progress make changes and to perform other desired functions.

In another embodiment, the present invention provides a method of splitting a CAD model into chunks such that each chunk can be printed by different mobile printers and the bonding strength between the chunks are ensured. Unlike traditional 3D printing, a CAD model needs to be sliced into layers and the path of the printhead movement needs to be planned to deposit materials for each layer, the methods of the present invention split a CAD model into chunks and tasks for printing robots and gripper robots. The chunks can be split in both XY direction and/or Z direction.

In one embodiment, the present invention uses a cooperative 3D printing platform such as a mobile 3D printer described, which replaces the XY stage on a regular 3D printer with a set of omnidirectional wheels to translate the printhead in XY direction. This enables unlimited printing in the X direction, but the Y direction is limited by the distance between the printhead and the front wheels (termed as "build depth") if a layer-by-layer based approach is used because the printed material in the previous layers will block the path of the wheels in Y direction.

A general slicing strategy for cooperative 3D printings may be as follows: Chunker: A CAD model of the print job will be first input into a "chunker", which splits the CAD model into chunks based on a set of criteria to ensure feasible printing of each chunk and good bonding between chunks. Slicer: The chunks will then be sliced into layers using a slicer, which generates commands for printing the chunks (e.g., tool paths, material extrusion, temperature control, etc.), schedules the sequence of printing the chunks among multiple robots, and insert communication commands to enable necessary communication among multiple robots. Simulator: The commands generated by the slicer is interpreted by a simulator, which visualizes and animates the dynamic printing process over time to provide a tool for evaluating the chunking and slicing parameters and results.

Chunker

The objective of chunking is to divide the printing job into chunks such that they can be assigned to as many robots as possible to increase the printing speed. Therefore, the overall chunking strategy is highly dependent on the geometry of the print, the number of available robots, and how the robots will be scheduled. To chunk for two or more robots, the print job may be split into multiple chunks along one direction with sloped planes to ensure good bonding between chunks. Two robots start from the center chunk and print along +Y and −Y direction respectively to finish each chunk. To calculate the geometries of these chunks, the original is geometry bisected multiple times around multiple planes and, by constraining the problem to chunking only in the +Y and −Y directions, each plane can be defined by two things: its slope and Y position.

A sloped interface between chunks is needed for this chunk-by-chunk based 3D printing strategy. The angle of the sloped plane needs to be carefully determined due to conflicting objectives: A maximum slope angle will maximize the volume of each chunk and increase printing efficiency; and, a minimum slope angle will maximize the area of the bonding interface and increase the bonding strength.

Figure 5B:
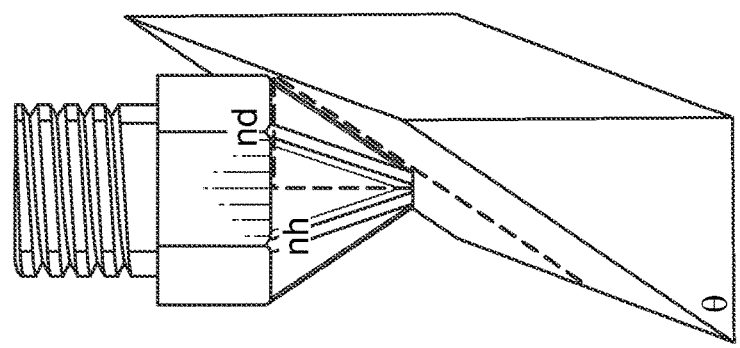
FIG. 5B illustrates the largest slope angle of a chunk is limited by the ratio of the nozzle height, nh, and the nozzle depth, nd.
Figure 5A:
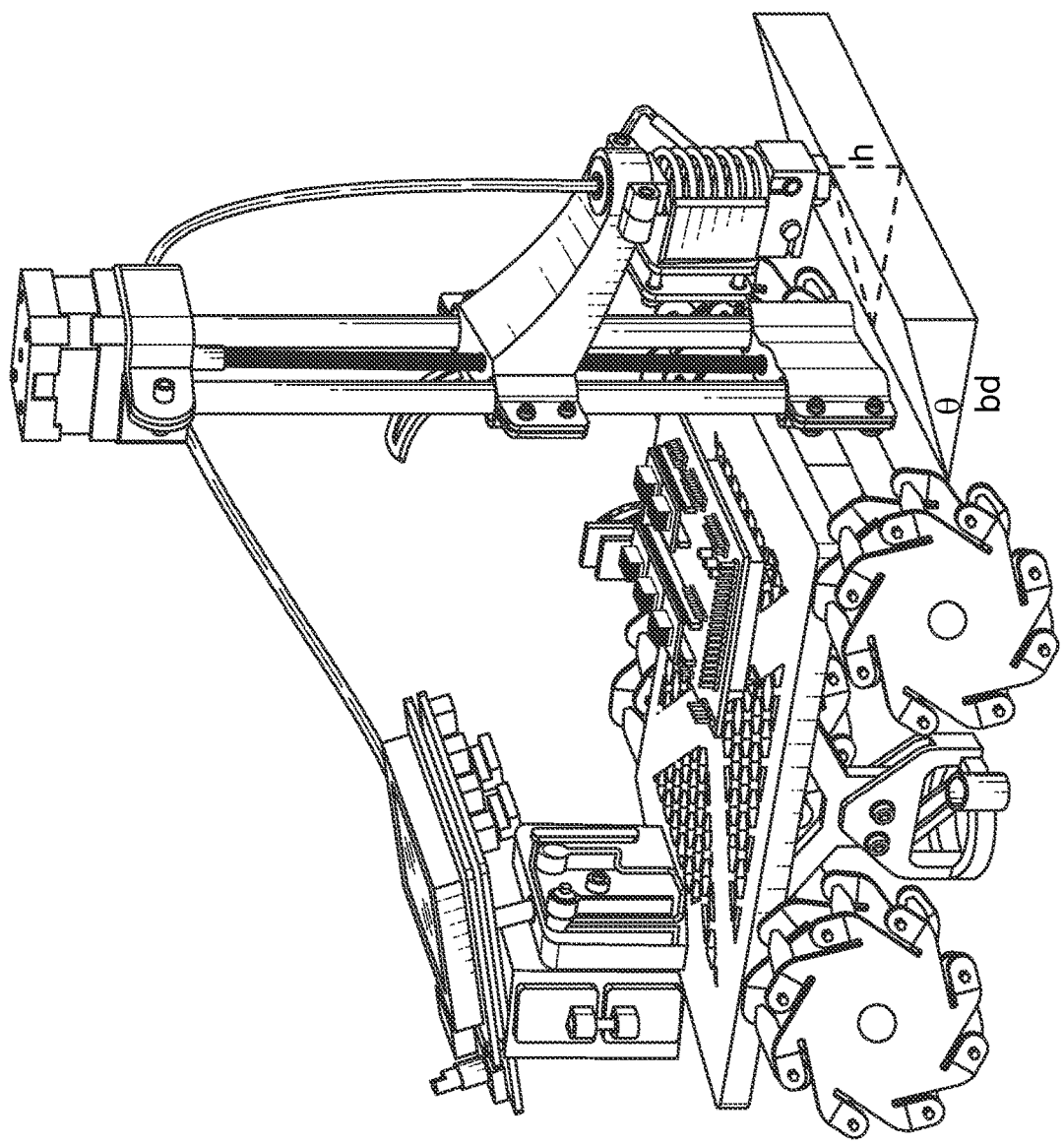
FIG. 5A illustrates the smallest slope angle of a chunk depends on the ratio of the object height, h, and the robot build depth, bd.

In addition, the range of the slope angle is limited by the robot parameters as illustrated in FIGS. 5A and 5B, which should be determined by:

$$\theta_{max} = \tan^{-1}\left(\frac{nh}{nd}\right) \quad (1)$$

$$\theta_{min} = \tan^{-1}\left(\frac{h}{bd}\right) \quad (2)$$

where $\theta_{max}$ and $\theta_{min}$ are the limits of the slope angle, nh and nd are the nozzle height and nozzle depth, h is the height of the object to be printed, and bd is the build depth of the printer, as illustrated in FIGS. 5A and 5B.

If the angle is too large or too small, either the front wheels of the robot or the nozzle will interfere with the printed material. It should be noted that the range of the angle is dependent on the printer design and the limits can be easily changed with a tilted nozzle or a printer with a changeable build depth. Tests should be performed to choose an appropriate slope angle.

Chunking Plane Determination

With a determined slope, deciding where to split the object is also needed by first finding a center chunk, which can only be printed by one robot. After the center chunk is completed, the printers of robots will finish the chunks on the left and the right side respectively. The center chunk's chunking planes can both be represented with their normal vector, $\underline{n}$, and any point on the plane, $\underline{p}_p$. The left and right chunking planes for the center chunk can be determined by:

$$\text{Plane } L: \underline{n} = \left(\underline{c} \times \left|(0, 0, h) + \frac{h}{\tan(\theta)} \perp \underline{c}\right|\right); \underline{p}_p = \left(\underline{p}_c + \frac{h}{\tan(\theta)} \perp \underline{c}\right) \quad (3)$$

$$\text{Plane } R: \underline{n} = \left(\underline{c} \times \left|(0, 0, h) - \frac{h}{\tan(\theta)} \perp \underline{c}\right|\right); \underline{p}_p = \left(\underline{p}_c - \frac{h}{\tan(\theta)} \perp \underline{c}\right) \quad (4)$$

where $\underline{c}$ is the normal vector of the center line of the object, $\underline{p}_c$ is a point on the center line, $\theta$ is the angle of the chunking plane previously determined, and $$\perp(x,y,z):=(-y,x,z) \quad (5)$$

After calculating these two planes, those planes may be iteratively shifted outward by a shift amount, s, from the center chunk (by iterating $\underline{p}_{i+1} \leftarrow \underline{p}_i + s\underline{c}$). The planes may be used to slice the model into subsequent "left" and "right" chunks.

Slicer

The objective of the slicer is to make sure the robots can work together to finish the printing according to the printing strategy. Unlike a regular slicer that only generates the tool path, the slicer for cooperative printing needs to accomplish three functions: Assign chunks to each robot and determine their printing sequence; Generate tool paths for each chunk and the tool paths for transition between chunks; Generate commands based on the tool path for the robots to execute and provide a mechanism for the robots to communicate with each other in case one robot's printing task is dependent on the status of the printing task of another robot.

Printing Sequence

In order to determine the path for a robot to follow, the robot must first know the chunks it will print and their sequence. The following strategy may be used to assign the chunks to two or more robots, where $C_A$ represents Robot A's chunks and $C_B$ represents Robot B's chunks:

$$C_A = [\text{center chunk, left chunk1, left chunk2, ...}] \quad (8)$$

$$C_B = [\text{right chunk1, right chunk2, ...}] \quad (9)$$

where Robot A is assigned with the center chunk and all the chunks on the left, and Robot B is assigned with all the chunks on the right. The chunks then may be ordered based on the scheduling strategy for the print job.

Tile, Strip and Groove Design

In another embodiment, the present invention provides a floor power module 2000 having a series of grooves 2010-2012 in an electrically conductive surface formed by conductive strips of alternating current 2020 (negative) and 2030 (positive). The grooves are the same width as the space between the conductive strips, but do not cut all the way through a conductive base which may be stainless-steel to maintain the conductivity of each strip. The idea is that current can still flow through the pre-existing conductive strips, but once filled with epoxy, the grooves and space between the strips are used to send a 'disconnect' signal to the robot when a brush passes over one. This allows the robot to keep track of its absolute position on the power tile.

Figure 6:
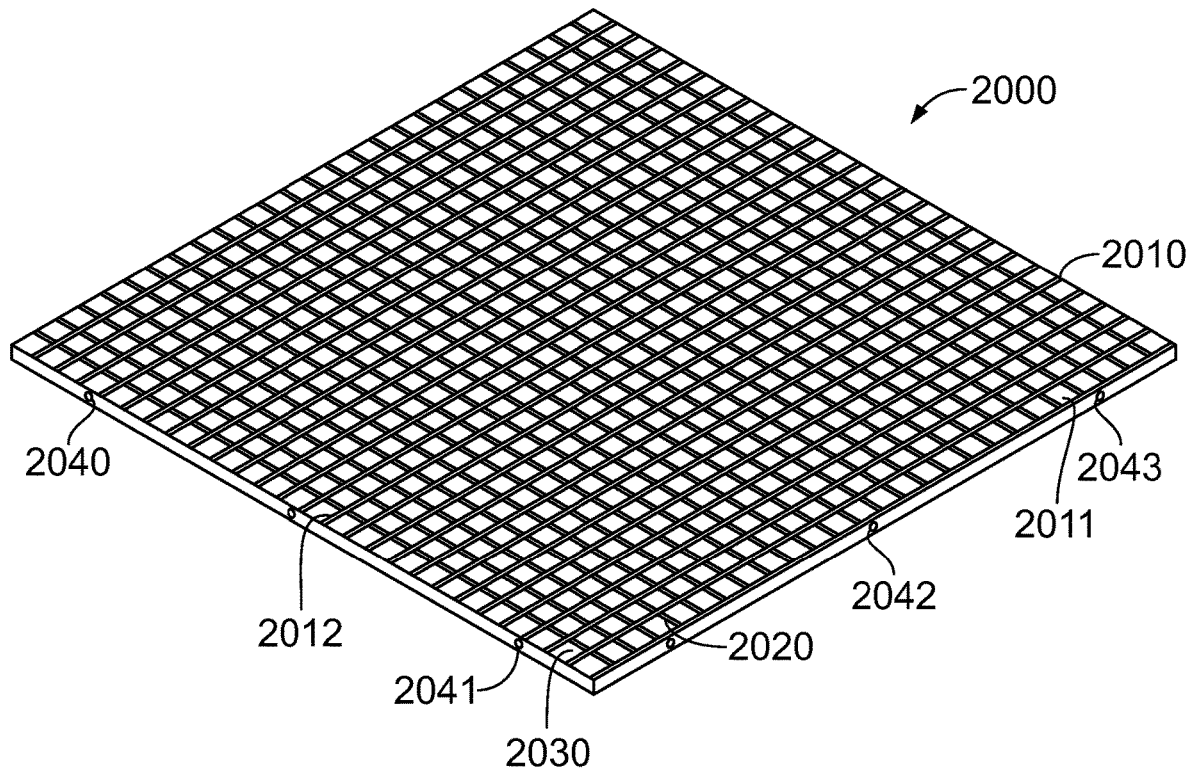
FIG. 6 is a perspective view of a floor that may be used with an embodiment of the present invention.
Figure 7:
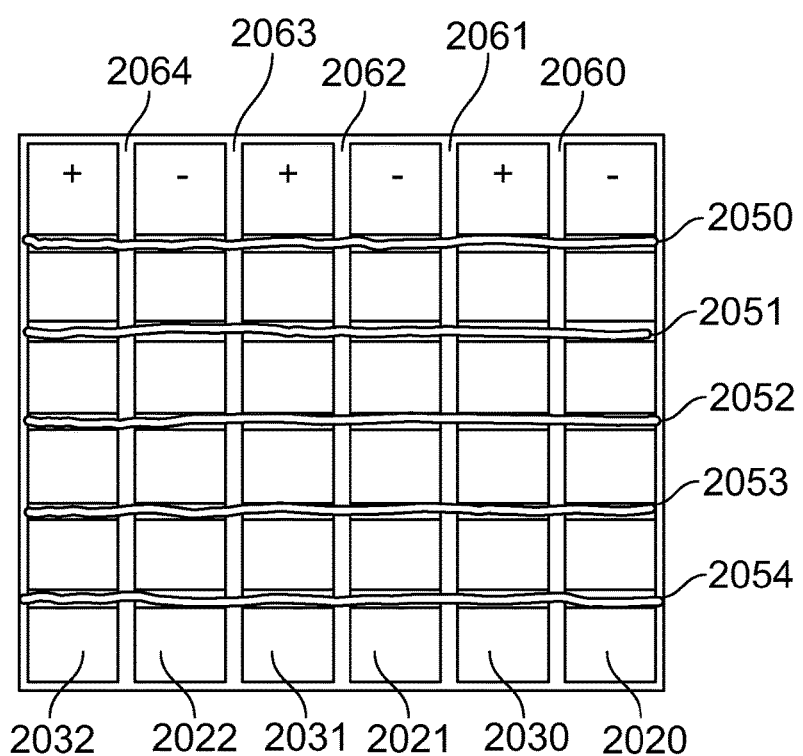
FIG. 7 is a top view showing strips with grooves and magnets for an embodiment of the present invention.

The smart floor incorporates an alternating positive and negative strip design with grooves. The strips are spaced equally in one direction with an insulation layer in between each strip. Along each strip, grooves with the same width of the of the insulation layer are machined at the same spacing as the strips to produce a grid design as shown in FIG. 6, which may be in the form of squares or other shapes to form electrically conductive islands surrounded by nonconductive areas.

In addition, power module may be in the form of a tile with magnets 2040-2043 distributed along the perimeter. When a plurality of tiles are used, because the magnets on each tile are aligned, the tiles may be quickly magnetically connected to form a many tiled working surface.

The design of a preferred tile is shown in FIGS. 7-10. Each tile, may be identical, and is comprised on negative strips 2020-2022 and positive strips 2030-2032 separated by grooves 2050-2054 and channels 2060-2064. Each groove and channel is of the same width expect for the grooves 2090 and 2091 on the outer edges which are one-half the width and are in the shape of a half channel. This is because when two grooves from separate tiles are connected, the combination produces a full groove.

As shown in FIG. 8, the depth of a channel reaches down to nonconductive base 2100. The depth of a groove does not reach base 2100 to maintain the conductivity of each strip. The grooves and channels are filled with a nonconductive material such as epoxy to create areas of that create a disconnect signal. In a preferred embodiment, the channels and grooves are linear and create an electrically non-conductive network which may be in the form of a lattice network of equally spaced apart perpendicular lines.

The conductive strips may will be machined from larger stainless steel sheets that are 0.018" thick. The sheet may will initially be attached to the polypropylene base using adhesive or epoxy and machined from one edge to meet the desire tolerance of 100 microns.

The idea of smart floor is to create tiles that allows the expansion and reduction in the overall floor area. This is done through incorporate magnets 2080-2086 located on the vertical edges of each tile for connectivity between tiles. The strips with grooves are attached to a polypropylene base. The polypropylene base has the magnetics embedded into its base as well as trench holes to allow to provide power to the strips Brush Configuration Each robot is equipped with brushes on the underside which engage a positive conductive area and negative conductive area. In a preferred embodiment, the conductive areas are square in shape and are located along the conductive strips as shown in FIG. 6. At a minimum, a brush needs to be in contact with at least one positive area and one negative area at all times no matter where located on the working surface.

Figure 11:
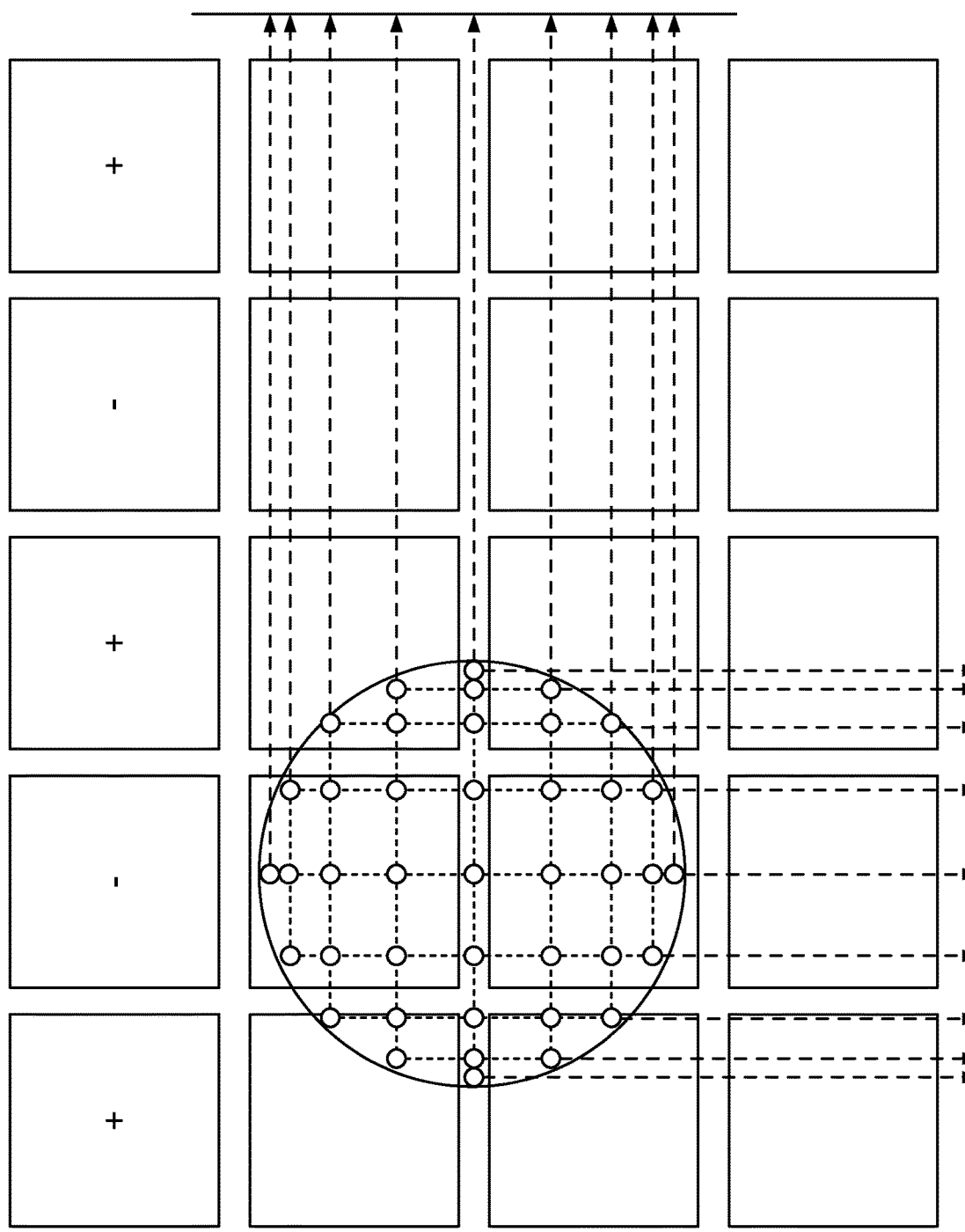
FIG. 11 show a configuration with infinite brushes. Brushes represented with gray dots are not of use since external brushes (colored in orange) have the same projection on the X or Y axis.
Figure 12:
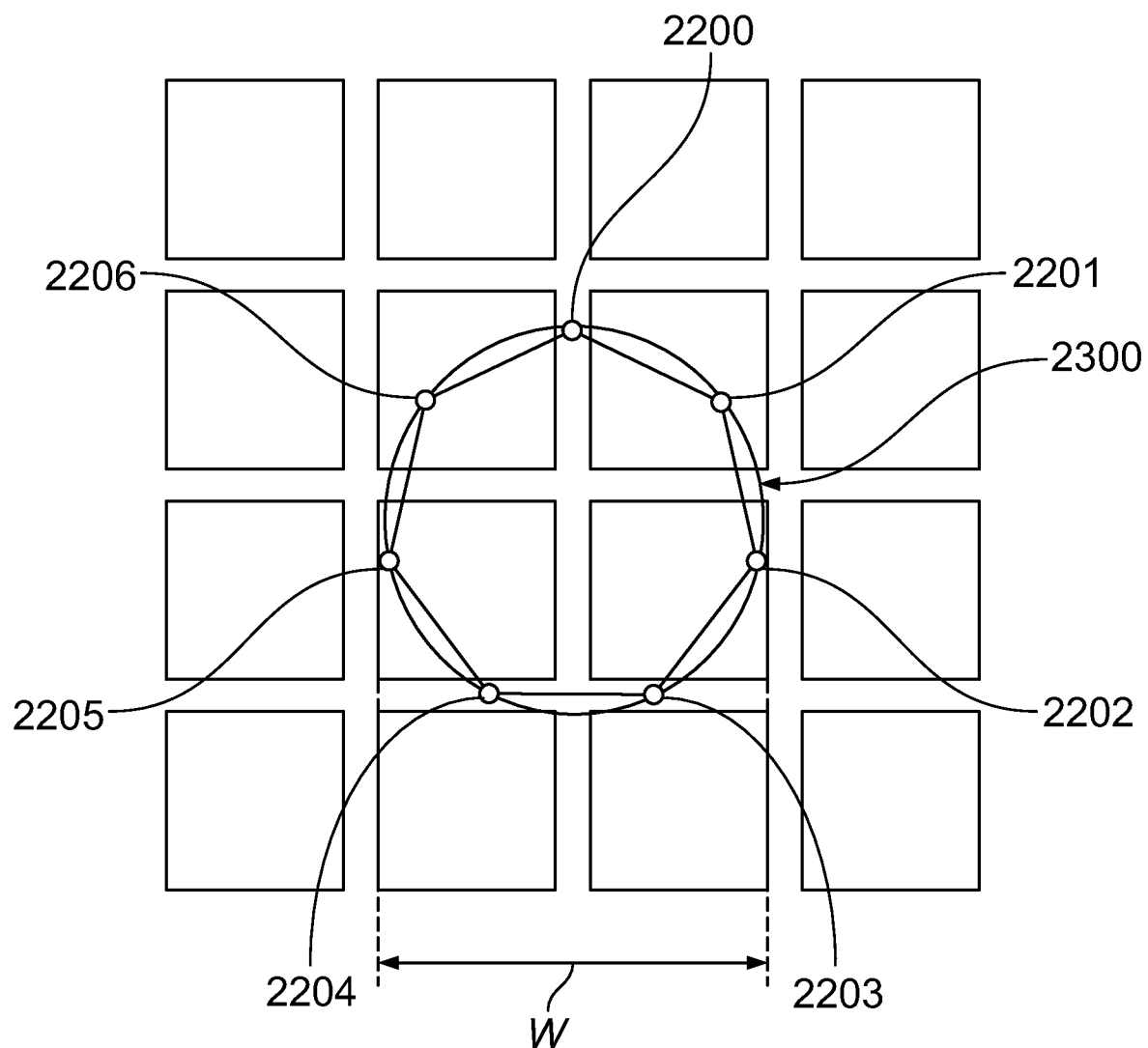
FIG. 12 shows a brush configuration proportional to the size of the floor grid.

A shown in FIGS. 11 and 12, a preferred brush configuration is based on a circle whose diameter is equal or less than the sum of two times the width of a conductive square and the width of an insulating strip. If the circle is filled with an infinite number of brushes, this configuration is capable of displacing over the grid without losing electrical continuity. Each of the brushes will have a projection on the X and Y axis that will indicate the electrical charge of the brush and the presence of the brushes on the squares. However, as it can be seen in FIG. 11, the projections of the brushes in the center of the circle overlap with the projections of the brushes on edge of the circle. This shows that the brushes located at the center of the configuration do not add benefit to the configuration and they can instead be represented by the external brushes 2200-2206 on the edge of circle 2300.

Once the concept of external brushes is established, the following step is reduce the number of brushes on the edge of the circle (i.e., external brushes) to the minimum that would allow a configuration that could still displace over the grid without losing electrical contact. From FIG. 11 it can be observed that when the number of brushes on the edge of the circle is even, the projections of the brushes on the top are overlapped by the projections of the brushes on the bottom. Therefore, an odd number of brushes at the edge of the circle is preferred over an even number of brushes. FIGS. 11 and 12 show that only a seven-brush configuration is able to keep electrical continuity when each are positioned in the worst case scenarios.

The dimensions of the seven-brush configuration are dependent upon the dimensions of the floor it will be placed on. As discussed previously, this configuration is based upon the idea of simplifying a circular geometry to a polygon, where the diameter of the initial circle is equal or less than the sum of two times the width of a conductive square and the width of an insulating strip. For a preferred embodiment of the present invention, the maximum width of the projection of the brushes is defined as the 'diameter', which must then be within the space of two conductive strips at one time. FIG. 12 shows this distance, w, as the width between the two outermost brushes. This distance is then set equal to the sum of two conductive strips and one insulating strip, such that these two brushes begin and end their transitions sequentially. In preferred embodiment, the dimensions were chosen to be: 0.875 in conductive strip width, 0.125 in insulating strip width, and a width of 1.875 in. It is permissible for this width to be less than this maximum, but not more.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A 3-D printing system comprising: a plurality of printers and an electrically conductive surface;

said printers being motorized to allow movement thereof in any direction and to allow free rotation thereof over said electrically conductive surface;

each of said printers having one or more printheads and a plurality of brushes for electrically connecting to said electrically conductive surface for powering said printers;

said electrically conductive surface being independent from said printers and adapted to receive a printed object formed by said printers; and said electrically conductive surface comprised of a plurality of electrically conductive islands surrounded by nonconductive areas comprised of perpendicularly extending grooves and channels, said islands comprised of alternating positive and negative conductive strips arranged over a nonconductive base, with a depth of said channels reaching down to said base and a depth of said grooves not reaching said base.

2. The system of claim 1 wherein said electrically conductive surface is comprised on a plurality tiles.

3. The system of claim 2 wherein each of said tiles is identical.

4. The system of claim 3 wherein each of said tiles is comprised of a plurality of said conductive strips disposed on a respective one of said nonconductive base.

5. The system of claim 3 wherein each of said conductive strips is comprised of a plurality of square sections that form said islands, said square sections separated by said grooves, and said grooves having a width.

6. The system of claim 5 wherein each of said conductive strips is separated by said channels, said channels having a width that is the same as said width of said grooves.

7. The system of claim 6 wherein said grooves and said channels are filled with a nonconductive material to form said nonconductive areas that surround said islands.

8. The system of claim 7 wherein said tiles have an outer edge groove that is in the shape of a half-groove that when connected to another half-groove of another one of said tiles forms a full groove.

9. The system of claim 8 wherein and said nonconductive material filling said grooves and channels is epoxy.

10. The system of claim 9 wherein said nonconductive areas form a lattice network.

11. The system of claim 10 wherein said brushes are equally spaced apart around a circle.

12. The system of claim 11 wherein said circle has a diameter that is equal or less than the sum of two times the width of one of said square sections plus said width of a channel.

13. The system of claim 12 wherein the system is configured such that each of said printers prints a portion of the printed object such that printed portions of the object form a completed printed object.

14. The system of claim 13 wherein said printers are adapted to insert pre-made portions of a print job into the printed object.

15. The system of claim 14 wherein said printers include a gripper to pick and place non-3D-printed components for assembly into the printed object.

16. The system of claim 15 wherein said printers each have a plurality of printheads adapted to print different materials.

17. The system of claim 16 wherein said printers each have one or more position sensors that take a series of pictures, the system being configured to compare the pictures to obtain relative motion of the printers.

18. The system of claim 17 wherein said one or more position sensors is one or more video cameras.

19. The system of claim 18 wherein said one or more video cameras is located underneath the printer.

20. The system of claim 1 wherein said printers are adapted to work together to print one or more of said printed object.

* * * * *